United States Patent Office 3,497,469
Patented Feb. 24, 1970

3,497,469
FIRE RETARDANT INTUMESCENT CLEAR POLYURETHANE COATINGS
Noel D. Blair, Tonawanda, N.Y., assignor to Hooker Chemical Corporation, Niagara Falls, N.Y., a corporation of New York
No Drawing. Filed Aug. 9, 1965, Ser. No. 478,403
Int. Cl. C08g 51/60
U.S. Cl. 260—45.9        8 Claims

ABSTRACT OF THE DISCLOSURE

There are provided fire retardant intumescent clear polyurethane coatings comprised of a polyurethane coating vehicle, a volatile solvent and an organophosphorus compound selected from the group consisting of:

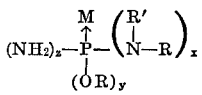

and

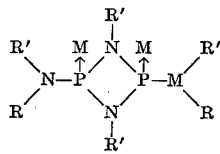

wherein M is selected from the group consisting of sulfur and oxygen; R is selected from the group consisting of halo-substituted and non-substituted alkyl of 1 to 12 carbon atoms, and halo-substituted and alkyl-substituted and non-substituted aryl of 6 to 20 carbon atoms; R' is selected from the group consisting of hydrogen and R; $x$ is 1–3; $y$ is 0–2; and $z$ is 0–1 wherein the sum of $x$, $y$ and $z$ equals 3.

---

This invention relates to fire retardant intumescent clear polyurethane coatings and, more particularly, to polyurethane coating compositions which are rendered fire retardant and intumescent by the use of certain organophosphorus compounds.

Fire retardant coatings are not new. The prior art includes references to fire proofing compositions which may be applied in paint and coating form which are said to be useful in retarding fire and flame spread. But the flame and fire retardants used in these coatings tend to impart some discoloration of the protective coatings. In some cases, this discoloration was only slight, but, in many cases, the discoloration was of such a nature that clear coatings were not possible and additional pigmentation had to be added to the coating to mask the fire retardant agent and produce a pleasing effect.

Many other fire retardant coatings have little or no flow quality and, hence, do not provide a desirable smoothness of film to qualify in usual protective and decorative coating applications.

Another serious limitation of many of the prior art fire retardant compositions is their lack of washability. Many of the prior art compositions which provide an intumescent film upon exposure to flame not only lack the smoothness wanted for decorative effective, but are inadequate in durability. Upon exposure to washing, as, for example, in removing of spots by periodic cleaning with soap and water, the films were solubilized in an aqueous washing media and were removed from the substrate. In many cases where removal did not occur, the latent intumescent quality of the coating was reduced in the first washing.

Many prior art fire retardant coating products were also significantly less effective than desired in providing the resistance to flame and creating an insulating barrier between the source of flame and the combustible material.

With the limitations of the prior art fire retardant compositions in mind, it is an object of this invention to provide a clear coating composition having application characteristics of high qualty organic solvent-reducible coatings.

It is an additional object of this invention to provide a clear coating composition which has permanent latent fire retardant qualities due to the abiliay of the deposited film to expand and provide an insulating layer between the flame source and the combustible substrate, as well as to provide a quantity of liberated decomposition products which are primarily non-combustible and which tend to extinguish the flame.

These and other objects of the invention will become apparent as the description of the invention and examples illustrative of the invention are more fully developed in the specification.

In accordance with this invention, there is provided a fire retardant intumescent clear coating comprised of a fire retardant qualities due to the ability of the deposited polyurethane coating vehicle, a volatile solvent and an organophosphorus compound selected from the group consisting of:

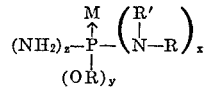

and

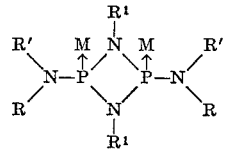

wherein M is selected from the group consisting of sulfur and oxygen; R is selected from the group consisting of alkyl and aryl; R' is selected from the group consisting of hydrogen alkyl and aryl, $x$ is 1–3; $y$ is 0–2; and $z$ is 0–1 wherein the sum of $x$, $y$ and $z$ equals 3.

The polymers or resins suitable for use in this invention are any of those materials known in the art as polyurethane resins. In a simplified manner, polyurethanes may be considered the reaction products of polyisocyanate and a polyhydroxyl material. The hydroxyl-containing polymeric materials generally have a hydroxyl number between about 30 and about 950 and are polyesters, alkyds, polyethers, polyphenols and mixtures thereof. The polyesters are reaction products of a polyhydric alcohol and a polycarboxylic compound, the polycarboxylic compound being either a polycarboxylic acid, a polycarboxylic acid anhydride, a polycarboxylic acid esters, a polycarboxylic acid halide or mixtures thereof. The carboxylic compounds can be aliphatic, cycloaliphatic, aromatic, or heterocyclic and either saturated or unsaturated. Among the polycarboxylic compounds which can be used to form the polyester are: maleic acid, fumaric acid, phthalic acid, isophthalic acid, terephthalic acid, tetrachlorophthalic acid, aliphatic acids such as oxalic, malonic, succinic, glutaric, adipic, 1,4-cyclohexadiene-1,2-dicarboxylic, and the like.

Alkyd resins, in general, are made by the reaction of dicarboxylic acids or anhydrides with a polyhydroxyl compound such as glycerine and may be modified by the use of other dicarboxylic acids and anhydrides or by the use of various natural oils or the acids derived from such oils. Typical natural oils are: linseed, soya, safflower and the like. Generally, polyethers are the reaction product of a monoepoxide and compounds selected from the group consisting of polyhydric alcohol, a polyphenolic compound and a polycarboxylic acid and mixtures thereof.

Useful polyols are prepared by condensing a phenol with an aldehyde. The phenol employed may be phenol itself, or it may be a substituted phenol, provided the phenol is unsubstituted in at least two of the ortho-, para-positions. The substituents can be halogen such as chlorine and bromine, alkyl and alkenyl groups of 1 to 18 carbon atoms in any of their isometric forms, alicyclic groups of 5 to 18 carbon atoms, such as cyclohexyl, cyclopentyl and methyl cyclohexyl, etc., aromatic and aryl alkyl groups of 6 to 18 carbon atoms, such as benzyl, alpha-methyl benzyl, cumyl and the like, and alkyl, alkenyl, alicyclic, aryl and aryl alkyl carboxylic groups wherein the hydrocarbon is defined hereinbefore and mixtures thereof. As indicated, the hydrocarbon radicals preferably have 1 to 18 carbon atoms. Among suitable substitute phenols are: para-tertiary-butylphenol, para-chlorophenol, para-tertiary hexyl phenol, para-isooctylphenol, para-phenyl phenol, para-benzyl phenol, para-cyclohexyl phenol, para-octadecyl phenol, para-nonyl phenol, para-beta-naphthyl phenol, para-alpha-naphthyl phenol, cetyl phenol, para-hydroxy-acetophenone, a phenol alicylated with limonene, as well as corresponding ortho- and meta-derivatives, such as orthobutylphenol, meta-butylphenol, and mixtures thereof. Additional phenolic compounds include naphthols and polyhydroxy benzenes and naphthylenes, such as resorcinol, hydroquinone and catechol.

In producing the parent phenol-aldehyde condensates, any suitable aldehyde or mixtures of aldehyde capable of reacting with the phenol and having not more than, e.g., 8 carbon atoms, is satisfactory, provided it does not contain a funtcional group or structure which is detrimental to the resinification reaction, or with the esterification or oxyalkylation of the resin. The preferred aldehyde is formaldehyde, which may be in aqueous solution or in any of its polymeric forms, such as paraform aldehyde or trioxane. Other examples of aldehydes which can be used include paraldehyde, furfural, 2-ethylhexanal, ethylbutyraldehyde, heptaldehyde, glyoxal and the like.

The amount of aldehyde to be condensed with the phenol may be varied to prepare novolacs of relatively high molecular weights in which the viscosity of the finish resin may be controlled by the mole weight of the novolac. Preferably, the amount of aldehyde used varies from 0.5 to 1.0 mole per mole of phenol when a mono- or difunctional phenol is used. In instances where a trifunctional phenol is used, the preferred upper limit of aldehyde may be about 0.85 mole per mole of phenol so as to prevent formation of insoluble infusible condensates.

When the novolac is prepared using above-described ratios of aldehyde to phenol, it is preferred that the aldehyde and phenol be reacted using acid catalysts, such as sulfuric, hydrochloric or oxalic acid, but basic catalyst may also be used. In some instances, catalysts may not be necessary. Examples of an alkyline catalyst include: ammonia, amines, alkali earth and quaternary ammonium bases. Wetting agents of the anionic types, such as sodium alkylaryl sulfonate, may speed up the reaction when weak acids are used and also may be present.

Various organic polyisocyanates can be used in preparing the urethane compositions utilized in this invention. Among these isocyanates are 2,4-toluene diisocyanate, 2,6-toluene diisocyanate, and mixtures thereof, and particularly the crude mixtures thereof that are commercially available. Other typical polyisocyanates include: methylene-bis-(4-phenylisocyanate), n-hexyl diisocyanates, 1,5-naphthylene diisocyanate, 1,3-cyclopentalene diisocyanate, -phenylene diisocyanate, 2,4,6-tolylene triisocyanate, and 4,4',4''-triphenylmethane triisocyanate. Higher isocyanates are provided by the liquid reaction products of:

(1) diisocyanates and
(2) polyols or polyamines, and the like.

In addition, isothiocyanates and mixtures of cyanates can be employed. Also contemplated are the many impure or crude polyisocyanates that are commercially available.

In preparing the polyurethane composition of this invention, the components are preferably reacted in a ratio sufficient to provide from about 85 to about 115 percent of isocyanate groups with respect to the total number of hydroxyl and carboxyl groups present in the hydroxyl-containing polymeric material. The reaction temperature generally ranges from about 20 to about 180 degrees centigrade, although higher or lower temperatures can be used.

Volatile vehicles or thinners are employed with the foregoing urethane compositions to facilitate the application of the urethane composition to the combustibles substrate to be protected. A wide variety of these vehicles and thinners may be used depending upon economic considerations, the particular polyurethane composition employed and the desired drying rate. Among the suitable materials for this purpose are aromatics such as benzene, toluene and xylene, esters such as 2-ethoxyethyl acetate and aliphatics such as mineral spirits and hexane. While the amount of volatile vehicle or thinner employed can be varied considerably, it is generally desirable that the final coating composition contain from 40 to 60 percent non-volatile matter, the balance being volatile vehicle or thinner.

The organophosphorus compounds of this invention are of the structure:

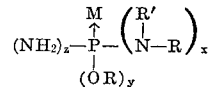

and

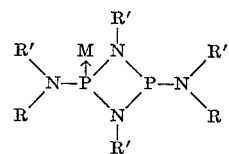

wherein M is oxygen or sulfur; R is substituted and non-substituted alkyl of 1 to 12 carbon atoms and substituted and non-substituted aryl of 6 to 20 carbon atoms; R' is hydrogen, substituted or non-substituted alkyl of 1 to 12 carbon atoms and substituted and non-substituted aryl of 6 to 20 carbon atoms; $x$ is 1, 2 or 3; $y$ is 0, 1 or 2; and $z$ is 0 or 1, the sum of $x$, $y$ and $z$ equals 3. The aryl substituents, if any, are halogen, i.e., chloro-, bromo-, fluoro- or alkyl. The alkyl substituents, if any, are halogen.

The preferred organophosphorus compounds are phosphoryl trianilide and dimeric phosphoric anil anilide having the structural formulas:

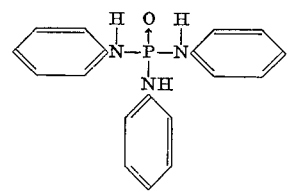

and

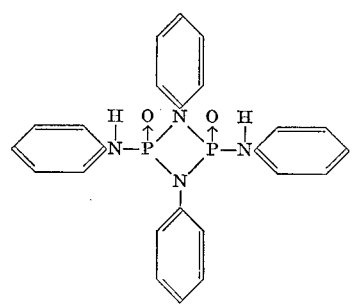

respectively.

The phosphorus anilides of this invention may be conveniently prepared by reacting aniline or substituted aniline with phosphorus oxychloride at a temperature range from about 20 to about 200 degrees centigrade, preferably with the use of a solvent and a post reaction HCl acceptor. The phosphorus trianilide is conveniently prepared by reacting 3 moles of aniline with one mole of phosphorus oxychloride, while the dimeric phosphorus anilide may be prepared by reacting 4 moles of aniline with 2 moles of phosphorus oxychloride.

Compounds included with the organophosphorus amides of this invention are:

Thiophosphoryltrianilide
Dimeric thiophosphoric acid anil anilide
Dimeric phosphoric anil imide
Diphenylphosphoramidate
Triethyltriamidothionophosphates
Diphenylphosphorylamidate

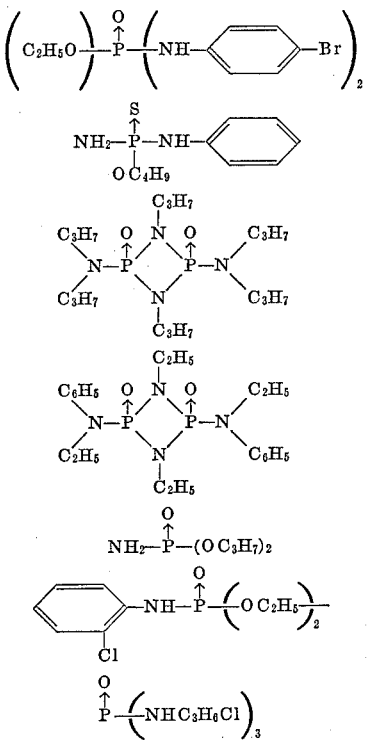

The organophosphorus compounds are added and mixed with the urethane resin in an amount of about 2 to 30 percent organophosphorus material based on the non-volatile content of the urethane resin. The most preferred amount of organophosphorus material used is about 3 to about 25 percent by weight of the non-volatile urethane resin.

The invented coatings are especially useful in preparing decorative plywood, pre-coated plywood, fiber boards, press (or composition) boards of all types and number of all sizes. The pre-coated products are usually mechanically coated by machines using spray or brush means of application. The polyurethane coating is supplied at a constant rate and is allowed to dry between successive coats, one coat being sufficient for priming, while two or more coats should usually be applied to achieve the protective or fire retarding qualities sought. The pre-coated article is then ready for conversion to the finish product without further coating. The products as prepared include construction materials, home furnishings such as wall panels, appliances, furniture and siding.

The coatings of this invention may be prepared in the conventional manner inasmuch as the preparation involves the stirring of liquids. The polyurethane composition and the organophosphorus compounds of this invention are thoroughly blended at a convenient time prior to applying the coat to the combustible substrate. This blending may be achieved by the use of paddles, mechanical mixers, drums rollers, and the like. In each case, the two components are thoroughly stirred until uniform dispersion is achieved.

The invented coatings shown in the examples below were applied to one quarter by eight by twelve inch (.6 by 20.3 by 54.5 cm.) yellow poplar panels by brushing. A complete uniform coating was applied to the panel. Backs, edges, and sides were also coated or sealed with the same material. The drying time may be varied so as to meet the conditions under which the composition is applied to the combustible substrate. For the purpose of testing, each panel was allowed to dry after coating until tack-free. Additional coatings were then applied until the desired thickness was obtained. For the purpose of these tests, a dry film thickness of approximately 10 thousandths of an inch or a total coverage of about 80.2 square feet per U.S. gallon, or about 2 square meters per liter, was employed. Four replicate panels of each composition were then air dried one week at room temperature and forty hours at 50 degrees centigrade.

Flame tests were carried out on the test panels using the test methods specified in American Society for Testing Materials, Procedure D–1360–58, entitled "Fire Retardancy of Paints, Method C." Testing is performed in a sheet metal test shield having inside dimensions of twelve inches (width) by twelve inches (depth) by thirty inches (height). The test shield was fitted with a smoke stack at the top. The shield had a viewing window in one side of sufficient size and in such a position that the specimens under tests could be observed. This viewing side was hinged so that the shield could be readily opened and closed to facilitate mounting and ignition of the test specimens.

The test specimens were mounted on a suitable support column face down, forming a 45-degree angle with the vertical. The flame source was absolute ethyl alcohol contained in a brass cup placed on a cork insulated metal pedestal and so positioned that the vertical distance from the cup lip nearest the panel base was exactly one inch. The cup was set an equal distance from the panel sides. The cup had an outside diameter of $15/16$ inch (2.4 cm.) with an outside height of $11/16$ inch (1.6 cm.) with a volume of 6 millimeters. Prior to testing, each panel is weighed to the nearest 0.1 gram. Using a pipette, 5 milliliters of alcohol are added to the cup and are ignited without delay by means of the Bunsen burner flame one half inch (1.2 cm.) in height. The test was allowed to continue until all flames were self-extinguished. Test panels were then cooled to room temperature and weight losses determined. Intumescence was measured with a depth gauge. The char areas were measured and char volume determined by measuring the depth of the char as evidenced by the longitudinal and lateral cuts, and multiplying this by the char area. The procedure is then repeated on at least three replicate panels.

The practice of the invention is illustrated by, but is not limited to the examples given below, which describe certain preferred forms thereof. All parts are by weight and all temperatures are in degrees centigrade unless otherwise noted.

EXAMPLE 1—CONTROL

A clear polyurethane coating (50 percent non-volatile in mineral spirits) was applied to yellow poplar panels, dried, and tested for fire retardancy. The polyurethane resin used in this coating composition was the reaction product of essentially equivalent amounts of toluene diisocyanate and an ethoxylated styrenated phenol-formaldehyde (4:3 ratio) resin modified with linseed oil to produce an oil length of about 53 percent. The film thickness of these test panels average 10.2 thousandths of an inch. After ignition, the panels had an average weight

| | |
|---|---|
| PO-1050 (5/69) | UNITED STATES PATENT OFFICE |

CERTIFICATE OF CORRECTION

Patent No. __3,497,469__    Dated __February 24, 1970__

Inventor(s) __-    Noel D. Blair__

It is certified that error appears in the above-identified patent and that said Letters Patent are hereby corrected as shown below:

Column 1, line 50, for "of" read -- to --. Column 2, line 11, for "abiliay" read -- ability --; column 2, line 23, delete "fire retardant qualities due to the ability of the deposited"; column 2, line 35, that portion of the formula reading

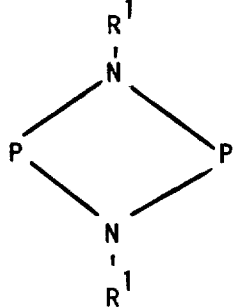 should read 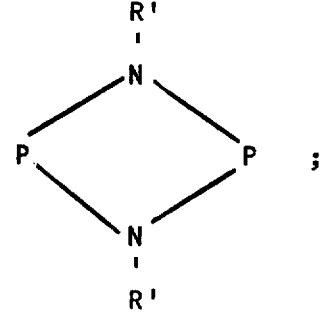 ;

column 2, line 56, for "esters" read -- ester --. Column 3, line 34, for "funtcional" read -- functional --. Column 5, line 11, for "with" read -- within --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents